(12) United States Patent
Lee (10) Patent No.: US 11,635,292 B2
(45) Date of Patent: Apr. 25, 2023

(54) DIGITAL MEASUREMENT APPARATUS AND DIGITAL MEASUREMENT METHOD

(71) Applicants: B&L BIOTECH, INC., Ansan-si (KR); In Whan Lee, Ansan-si (KR)

(72) Inventor: In Whan Lee, Ansan-si (KR)

(73) Assignee: B&L BIOTECH, INC., Ansan-si (KR)

( * ) Notice: Subject to any disclaimer, the term of this patent is extended or adjusted under 35 U.S.C. 154(b) by 388 days.

(21) Appl. No.: 17/058,274

(22) PCT Filed: Sep. 28, 2020

(86) PCT No.: PCT/KR2020/013171
§ 371 (c)(1),
(2) Date: Nov. 24, 2020

(87) PCT Pub. No.: WO2021/145535
PCT Pub. Date: Jul. 22, 2021

(65) Prior Publication Data
US 2022/0307816 A1    Sep. 29, 2022

(30) Foreign Application Priority Data
Jan. 16, 2020    (KR) .................. 10-2020-0005781

(51) Int. Cl.
*G01B 11/02*    (2006.01)
*G01B 7/04*    (2006.01)
(Continued)

(52) U.S. Cl.
CPC .............. *G01B 11/02* (2013.01); *G01B 7/042* (2013.01); *G01B 17/00* (2013.01); *A61C 5/42* (2017.02)

(58) Field of Classification Search
CPC ........ G01B 11/02; G01B 7/042; G01B 15/00; G01B 17/00
(Continued)

(56) References Cited

U.S. PATENT DOCUMENTS 4,649,648 A * 3/1987 Nagaoka ................. G01B 5/02
33/700
5,414,265 A * 5/1995 Sartore ................ G01B 15/00
250/397
(Continued)

FOREIGN PATENT DOCUMENTS

CN           102470268 A    5/2012
KR        10-1373064 B1    3/2014
(Continued)

OTHER PUBLICATIONS

International Search Report dated Jan. 5, 2021, from International Searching Authority in International Application No. PCT/KR2020/013171.
(Continued)

*Primary Examiner* — George B Bennett
(74) *Attorney, Agent, or Firm* — Sughrue Mion, PLLC (57) ABSTRACT

Disclosed is a digital measurement apparatus including a mounting part on which a measurement object is placed; and a measuring part for measuring the length of the measurement object and providing the measurement value of the measured measurement object as a reference value for adjusting the length of a new measurement object, wherein the measuring part measures the length of the measurement object using any one selected from among a moving method of converting a distance moved due to interference with the measurement object placed on the mounting part; a radiation method of radiating a measurement signal toward the measurement object and converting information of the detected measurement signal into the length of the measurement object; and a scanning method of scanning the measurement object. With this configuration, accuracy in measuring the length of a measurement object may be improved using a simple structure.

21 Claims, 6 Drawing Sheets

(51) Int. Cl.
  *G01B 17/00*   (2006.01)
  *A61C 5/42*   (2017.01)
(58) Field of Classification Search
  USPC .................................................. 33/700, 712
  See application file for complete search history.

(56) References Cited

U.S. PATENT DOCUMENTS

| | | | |
|---|---|---|---|
| 6,358,049 B1 | 3/2002 | Cerniway | |
| 7,121,015 B2 * | 10/2006 | Boge | G01D 5/34707 33/700 |
| 7,690,567 B2 * | 4/2010 | Mauerberger | G01D 5/366 235/440 |
| 8,782,916 B2 * | 7/2014 | Yan | G01D 11/30 33/708 |
| 2020/0184617 A1 * | 6/2020 | Perron | G06T 7/38 |
| 2022/0237761 A1 * | 7/2022 | Colle | H04N 23/56 |

FOREIGN PATENT DOCUMENTS

| | | |
|---|---|---|
| KR | 10-1527255 B1 | 6/2015 |
| KR | 10-2017-0034472 A | 3/2017 |
| KR | 10-1924314 B1 | 12/2018 |
| KR | 10-2019-0051420 A | 5/2019 |
| KR | 10-2064829 B1 | 1/2020 |

OTHER PUBLICATIONS

Office Action dated Mar. 1, 2022 in Chinese Application No. 202080002918.3.

* cited by examiner

DIGITAL MEASUREMENT APPARATUS AND DIGITAL MEASUREMENT METHOD

CROSS REFERENCE TO RELATED APPLICATIONS

This application is a National Stage of International Application No. PCT/KR2020/013171 filed Sep. 28, 2020, claiming priority based on Korean Patent Application No. 10-2020-0005781 filed Jan. 16, 2020.

TECHNICAL FIELD

The present disclosure relates to a digital measurement apparatus and a digital measurement method, and more particularly, to a digital measurement apparatus capable of accurately measuring a measurement object, such as a dental endodontic file, and a digital measurement method.

BACKGROUND ART

General dental endodontic files are used in dental procedures such as root canal length measurement, dental pulp (nerve tissue) removal, and root canal preparation. Here, root canal preparation is a process of completely removing nerve tissues and infected root canal walls present inside the root canal of a tooth and widening the root canal.

Meanwhile, the length of a tooth nerve varies from patient to patient. Thus, in root canal treatment, an endodontic file having a length corresponding to the nerve length of each patient must be used. Accordingly, the length of a root canal must be measured first when performing root canal treatment.

In general, an endodontic file is provided with a stopper. When measuring the length of a root canal, the stopper is moved to a measurement point, and the length of the root canal is displayed. When the length of the root canal is displayed on the endodontic file by moving the stopper, the length of the endodontic file is measured, and the length of the root canal is calculated. At this time, the root canal must be gradually expanded into a round shape, and debris, such as nerve tissues, in the root apex must be removed. Thus, at the beginning, a relatively thin endodontic file is used, and the thicknesses of endodontic files used later are gradually increased.

Meanwhile, when the position of the stopper of an endodontic file is manually adjusted, it is difficult to read a fine scale, which limits accuracy in length measurement. In addition, the position of a stopper may be changed due to a therapist's mistake, and thus length measurement is repeatedly performed, causing increase in treatment time and decrease in treatment reliability.

Therefore, in recent years, to improve treatment accuracy and treatment reliability, studies have been continuously conducted to accurately measure the length of an endodontic file.

DISCLOSURE

Technical Problem

Therefore, the present disclosure has been made in view of the above problems, and it is an object of the present disclosure to provide a digital measurement apparatus and a digital measurement method that enable accurate measurement of the length of a measurement object, such as an endodontic file for dental procedures, through a simple measurement method.

It is another object of the present disclosure to provide a digital measurement apparatus and a digital measurement method that improve ease of adjustment by measuring the length of a measurement object, providing the measured length as a reference value for adjusting the length of a new measurement object, and comparing the reference value and the length of the new measurement object.

Technical Solution

In accordance with one aspect of the present disclosure, provided is a digital measurement apparatus including a mounting part on which a measurement object is placed; and a measuring part for measuring a length of the measurement object and providing a measurement value of the measured measurement object as a reference value for adjusting a length of a new measurement object, wherein the measuring part measures the length of the measurement object using any one selected from among a moving method of converting a distance moved due to interference with the measurement object placed on the mounting part; a radiation method of radiating a measurement signal toward the measurement object and converting information of the detected measurement signal into a length of the measurement object; and a scanning method of scanning the measurement object.

In addition, the mounting part may include a flat cradle provided with a reference point with which one side of the measurement object is aligned, and the measurement object may include an endodontic file provided with a stopper. In this case, the measurement object may be placed on the mounting part so that the stopper is aligned with the reference point.

In addition, the mounting part may be configured to be removable for disinfection.

In addition, the measuring part may include a moving member movable in conjunction with the measurement object; and a conversion part for converting the movement distance according to movement of the moving member into a length of the measurement object.

In addition, the moving member may be equipped with a driving means, may have driving force to be pressurized toward the measurement object, and may be capable of linear reciprocating motion along a rail, and the conversion part may convert change in an electrostatic capacity due to a driving rotational speed of the moving member moving along the rail or movement of the moving member into a length of the measurement object.

In addition, the moving member may be capable of linear reciprocating motion along a rail by including an electromagnet that selectively generates electromagnetic force according to a signal input from outside and is capable of pressurizing the moving member toward the measurement object, and the conversion part may convert change in an electrostatic capacity due to driving rotational speed of the moving member moving along the rail or movement of the moving member into a length of the measurement object.

In addition, in the radiation method, the measuring part may radiate the measurement signal in a horizontal or perpendicular direction toward an end of the measurement object.

In addition, the measurement signal may include a laser or ultrasonic signal.

In addition, the measuring part may measure a time from a time point at which the measurement signal is radiated toward the measurement object to a time point at which the measurement signal is reflected back from the measurement object and returned to the measuring part, may convert the measured time into a length, and may divide the length by 2 to calculate a length of the measurement object.

In addition, the mounting part may include a scanner on which the measurement object is placed, wherein the scanner is provided in an enclosed space, and the measuring part may radiate light toward the measurement object and scans a shadow of the measurement object.

In addition, the digital measurement apparatus may include a comparison part for displaying a reference value measured in the measuring part and comparing a length of the new measurement object with the reference value.

In addition, the new measurement object may be placed to be adjacent to the reference value displayed on the comparison part, and a length of the measurement object may be adjusted so that the length of the measurement object matches the reference value.

In addition, a first image corresponding to the reference value and a second image corresponding to a measured value for a length of the new measurement object measured in the measuring part may be displayed side by side on the comparison part, and a length of the new measurement object may be adjusted so that the second image matches the first image.

In accordance with another aspect of the present disclosure, provided is a digital measurement method including a measurement step of measuring a length of a measurement object to be measured; and a comparison step of setting a value measured in the measurement step as a reference value and comparing a length of a new measurement object with the reference value to adjust the length of the new measurement object, wherein, in the measurement step, a length of the measurement object is measured using any one selected from among a moving method of converting a distance moved due to interference with the measurement object; a radiation method of radiating a measurement signal toward the measurement object and converting information of the detected measurement signal into a length of the measurement object; and a scanning method of scanning the measurement object.

In addition, the measurement step may include a moving step in which a moving member is moved along a rail so that the moving member is pressurized toward the measurement object; and a conversion step of detecting change in an electrostatic capacity or change in a driving rotational speed due to movement of the moving member and converting the change into a length of the measurement object. In this case, in the moving step, the moving member may be pressurized toward the measurement object by driving force of a motor or electromagnetic force of an electromagnet and may be moved toward the measurement object.

In addition, the measurement step may include a radiation step of radiating the measurement signal toward the measurement object; and a conversion step of converting the measurement signal reflected back from the measurement object into a length and dividing the length by 2 to calculate a length of the measurement object. In this case, the measurement signal may include a laser or ultrasonic signal.

In addition, the measurement signal may be radiated in a horizontal or perpendicular direction toward an end of the measurement object.

In addition, in the measurement step, light may be radiated toward the measurement object placed on a scanner and a shadow of the measurement object may be scanned.

In addition, the comparison step may include a display step of displaying the reference value as an image through a display means; and an adjustment step of placing the new measurement object so as to be adjacent to the image and adjusting a length of the new measurement object so as to match the image.

In addition, the comparison step may include a display step of displaying the reference value as a first image on a display means; and an adjustment step of displaying a measured value of the new measurement object as a second image on the display means so as to be adjacent to the first image and adjusting a length of the new measurement object so that the first and second images match.

In addition, the digital measurement method may further include, after the comparison step, a notification step of notifying that a measured value of the new measurement object matches the reference value.

Advantageous Effects

According to the present disclosure having the above configuration, the length of a measurement object is measured using a movement distance according to movement toward a measurement object or a signal reflected when a predetermined signal is radiated toward a measurement object. Thus, the present disclosure can improve accuracy in measuring the length of a measurement object using a simple structure and method.

In addition, accuracy in measuring the length of a measurement object such as an endodontic file, which is a device for dental procedures, can be improved using a simple structure. Accordingly, accessibility of a user and treatment reliability can be improved.

Although the present disclosure has been described above with reference to the embodiments of the present disclosure, those skilled in the art may variously modify and change the present disclosure without departing from the spirit and scope of the present disclosure as set forth in the claims below.

BEST MODE

Hereinafter, preferred embodiments of the present disclosure will be described with reference to the accompanying drawings. However, the spirit of the present disclosure is not limited to the embodiments, and the spirit of the present disclosure may be proposed differently by adding, changing, and deleting the elements constituting the embodiments, which is also within the spirit of the present disclosure.

Figure 1:
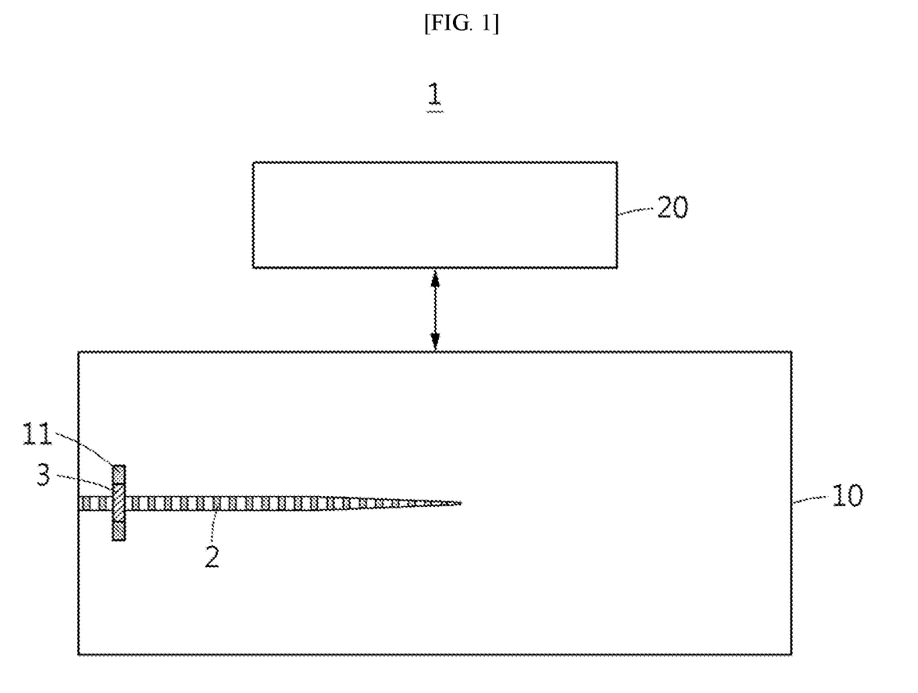
FIG. 1 is a configuration diagram schematically showing a digital measurement apparatus according to a preferred embodiment of the present disclosure.
Figure 2:
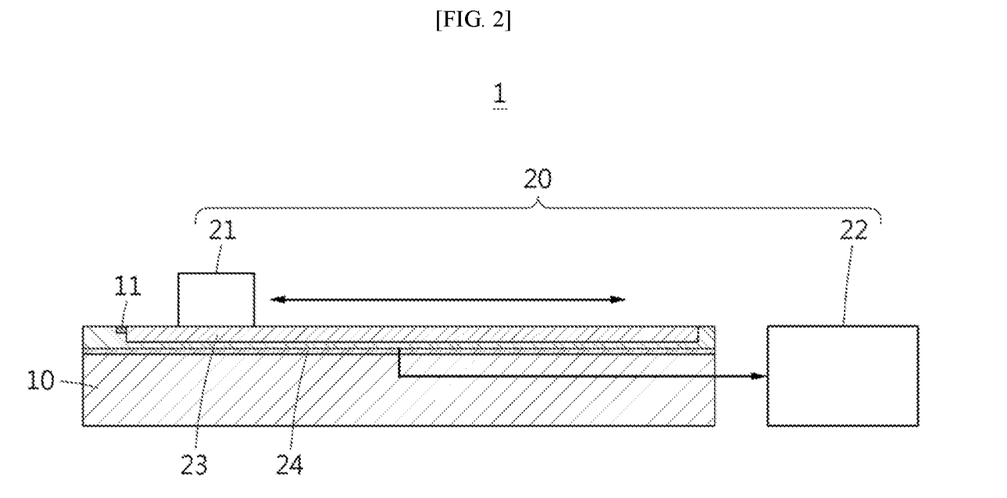
FIG. 2 is a cross-sectional view of a digital measurement apparatus according to a preferred embodiment of the present disclosure.

Referring to FIGS. 1 and 2, a digital measurement apparatus 1 according to a preferred embodiment of the present disclosure includes a mounting part 10 and a measuring part 20.

For example, the digital measurement apparatus 1 of the present disclosure may be an apparatus for measuring the length of a measurement object 2 to perform a dental procedure. More specifically, the measurement object 2 of the present disclosure may be an endodontic file used in root canal length measurement, dental pulp (nerve tissue) removal, root canal preparation, and the like when endodontic treatment is performed, without being limited thereto.

The measurement object 2 is placed on the mounting part 10. As shown in FIG. 2, the measurement object 2 is placed on the mounting part 10, and one side of the mounting part 10 is provided with a reference point 11 with which one side of the measurement object 2 is aligned.

For example, the mounting part 10 may be formed in a cradle shape having a flat upper surface so that the measurement object 2 is placed on the mounting part 10. In addition, the shape of the reference point 11 is not limited to the shape shown in FIG. 2, and the reference point 11 may be provided in various forms, such as a groove or a projection, on the mounting part 10.

Meanwhile, although not shown in detail, to protect the measurement object 2 including a treatment tool, such as an endodontic file, from bacterial infection, the mounting part 10 is preferably configured to be removable for replacement and disinfection.

The measuring part 20 measures the length of the measurement object 2 placed on the mounting part 10. Here, the measuring part 20 measures the length of the measurement object 2 placed on the mounting part 10 and provides the measured value of the measurement object 2 as a reference value S (see FIG. 5) for adjusting the length of the new measurement object 2.

In addition, the measuring part 20 according to the present disclosure measures the length of the measurement object 2 using any one selected from among a moving method of converting a distance moved due to interference with the measurement object 2 placed on the mounting part 10, a radiation method of radiating a measurement signal toward the measurement object 2 and converting information of the detected measurement signal into the length of the measurement object 2, and a scanning method of scanning the measurement object 2.

Figure 3:
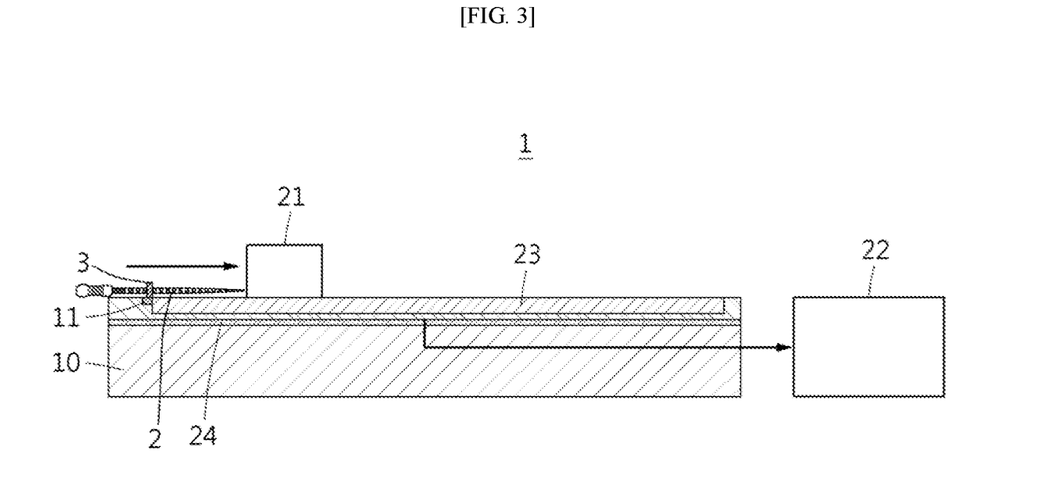
FIG. 3 is a cross-sectional view schematically showing the measurement operation of the digital measurement apparatus shown in FIG. 2.

As shown in FIGS. 2 and 3, the measuring part 20 of the digital measurement apparatus 1 according to a preferred embodiment of the present disclosure measures the length of the measurement object 2 using the moving method.

Referring to FIG. 2, the measuring part 20 includes a moving member 21 and a conversion part 22.

The moving member 21 is movable in the longitudinal direction on the mounting part 10. As shown in FIGS. 2 and 3, the moving member 21 is movable in the longitudinal direction along a rail 23 provided on the mounting part 10. In this case, the rail 23 supports the moving member 21 to be movable in the longitudinal direction with respect to the reference point 11 provided on the mounting part 10.

In addition, the moving member 21 is movable in a linear direction along the rail 23 by the rotational driving force of a motor (not shown). In this case, the moving member 21 is subjected to the driving force of the motor (not shown) and has force to move toward the reference point 11. That is, the motor (not shown) as a driving force generating means is installed inside the moving member 21. The moving member 21 is moved along the rail 23 by driving force generated in the motor (not shown) and is simultaneously pressurized toward the reference point 11.

As shown in FIG. 3, the moving member 21 may be moved in the direction of the arrow by interfering with the end of the measurement object 2 placed on the mounting part 10. More specifically, as the measurement object 2 is placed on the mounting part 10 while the measurement object 2 is aligned with the reference point 11 of the mounting part 10, the end of the measurement object 2 pressurizes the moving member 21 to move the moving member 21. In this case, when the moving member 21 is moved in the direction of the arrow by contact with the end of the measurement object 2, the moving member 21 is pressurized toward the reference point 11 by the driving force of the motor (not shown). Thus, the moving member 21 is kept in close contact with the end of the measurement object 2.

In addition, the measurement object 2 of the present disclosure includes an endodontic file, and the endodontic file is provided with a stopper 3. In this case, when the length of a root canal is measured using the endodontic file, when the stopper 3 is moved to a measurement point and the root canal length is displayed, the length of the measurement object 2 to be measured corresponds to the length between the stopper 3 and the end of the measurement object 2. Accordingly, the measurement object 2 is mounted so that the stopper 3 of the measurement object 2 is arranged at the reference point 11 of the mounting part 10, and the measuring part 20 measures the length of the measurement object 2 extending from the reference point 11.

The conversion part 22 converts a movement distance according to movement of the moving member 21 into the length of the measurement object 2. More specifically, the conversion part 22 converts the rotational speed of the moving member 21 moving along the rail 23 or change in an electrostatic capacity according to movement of the moving member 21 into the length of the measurement object 2. In FIGS. 2 and 3, a case wherein the conversion part 22 converts change in an electrostatic capacity into the length of the measurement object 2 is exemplified.

As shown in FIG. 2, a copper plate for detecting electrostatic capacity is provided along the rail 23 of the mounting part 10. As shown in FIGS. 2 and 3, the conversion part 22 recognizes change in an electrostatic capacity in the copper plate 24 according to movement of the moving member 21, and converts the change into the length of the measurement object 2. The copper plate 24 may be provided on the mounting part 10 so as to face the rail 23, without being limited thereto. Alternatively, the copper plate 24 may be provided integrally with the rail 23.

Figure 4:
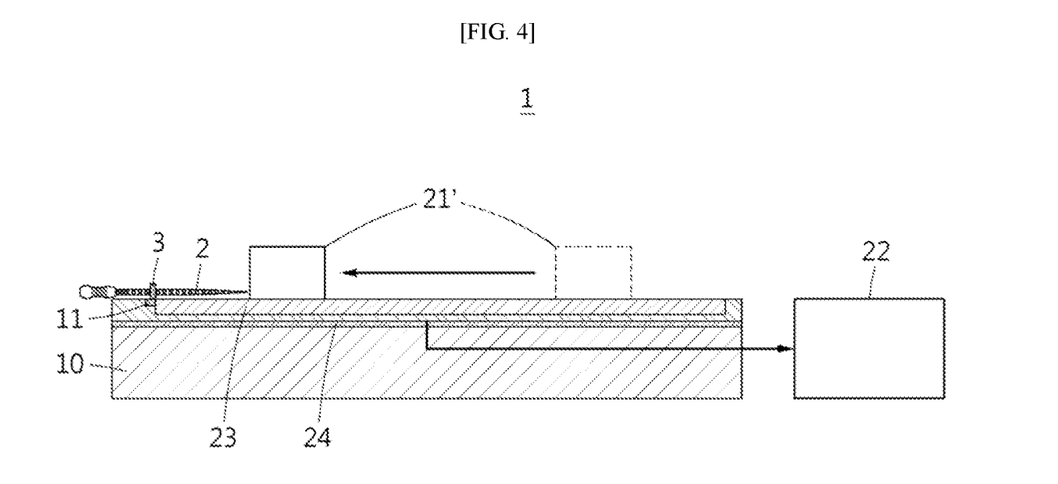
FIG. 4 is a cross-sectional view schematically showing a modified example of the measuring part shown in FIGS. 2 and 3.

In addition, FIGS. 2 and 3 illustrate that the moving member 21 is moved away from the reference point 11 by entry of the measurement object 2 in a state wherein the moving member 21 of the measuring part 20 is located near the reference point 11, but the present disclosure is not limited thereto. That is, as shown in FIG. 4, a modified example, in which a moving member 21' located at a position spaced apart from the reference point 11 moves toward the reference point 11 so that the moving member 21' is brought into contact with the measurement object 2, is also possible. The moving member 21' shown in FIG. 4 is moved by the driving force of a motor (not shown) along the rail 23, and the conversion part 22 detects change in an electrostatic capacity in the copper plate 24 according to movement along the rail 23 and converts the change into the length of the measurement object 2.

In addition, instead of a measurement method of detecting change in an electrostatic capacity in the copper plate 24, the conversion part 22 may detect the driving rotational speed of the moving member 21 moving along the rail 23 and convert the change into the length of the measurement object 2.

In addition, FIGS. 2 to 4 illustrate that the moving member 21 is movable by the driving force of the motor (not shown), but the present disclosure is not limited thereto. For example, the moving member 21 may be provided so that electromagnetic force is generated when an electrical signal is input from an external source such as an electromagnet. When electromagnetic force is generated, the moving member 21 may be pressurized toward the reference point 11. In this case, the moving member 21 including an electromagnet may also be moved in the longitudinal direction along the rail 23.

The moving member 21 including an electromagnet has force to automatically return to the reference point 11 when an electrical signal is input. Preferably, the strength of this force is such that movement of the measurement object 2 is not deformed. Accordingly, when the measurement object 2 is detached from the mounting part 10, the moving member 21 is moved toward the reference point 11 in an electromagnetic manner and is positioned at the reference point 11.

In the case of the moving member 21 according to the electromagnetic manner, when the measurement object 2 is mounted so as to be aligned with the reference point 11 of the mounting part 10, the moving member 21 is pressurized toward the reference point 11 by electromagnetic force and is brought into contact with the end of the measurement object 2. When the moving member 21 is brought into contact with the end of the measurement object 2 in this way, the conversion part 22 reversely calculates the opposite movement distance of the moving member 21 to convert this distance into the length of the measurement object 2. At this time, the conversion part 22 converts change in an electrostatic capacity of the copper plate according to movement of the moving member 21 to measure the length of the measurement object 2. Alternatively, the conversion part 22 may convert the driving rotational speed of the moving member 21 moving along the rail 23 to calculate the length of the measurement object 2.

Figure 5:
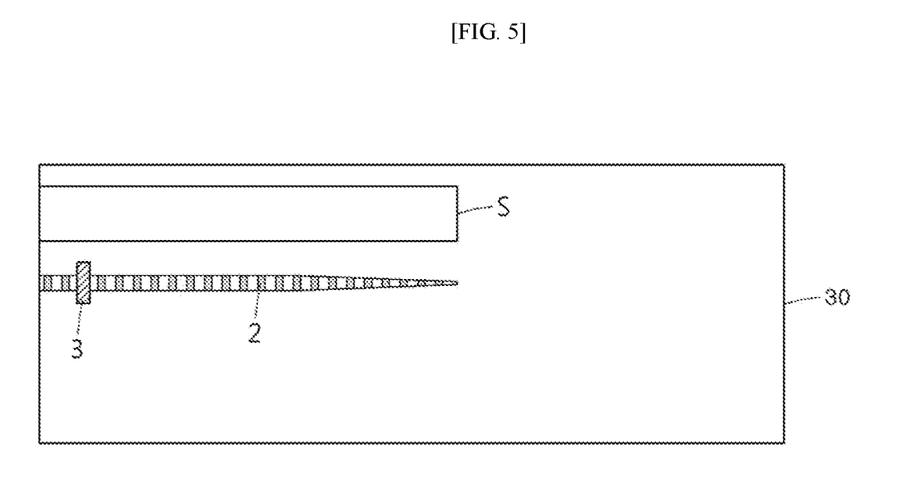
FIG. 5 is a schematic drawing for explaining a first method of displaying the length of the measurement object measured in FIGS. 2 to 4 as a reference value on a comparison part and adjusting the length of a new measurement object.

As shown in FIG. 5, in addition to the mounting part 10 and the measuring part 20, the digital measurement apparatus 1 of the present disclosure may further include a comparison part 30.

The comparison part 30 provides the length of the measurement object 2 measured by the measuring part 20 as the reference value S, and compares the length of the newly placed measurement object 2 with the reference value S. When the length of the measurement object 2 is measured by the measuring part 20 and is set as the reference value S, as shown in FIG. 5, the comparison part 30 may display the length of the measurement object 2 in the form of a predetermined shape such as a rectangle. That is, the comparison part 30 includes a display means, and displays the length of the measurement object 2 as an image.

Figure 6:
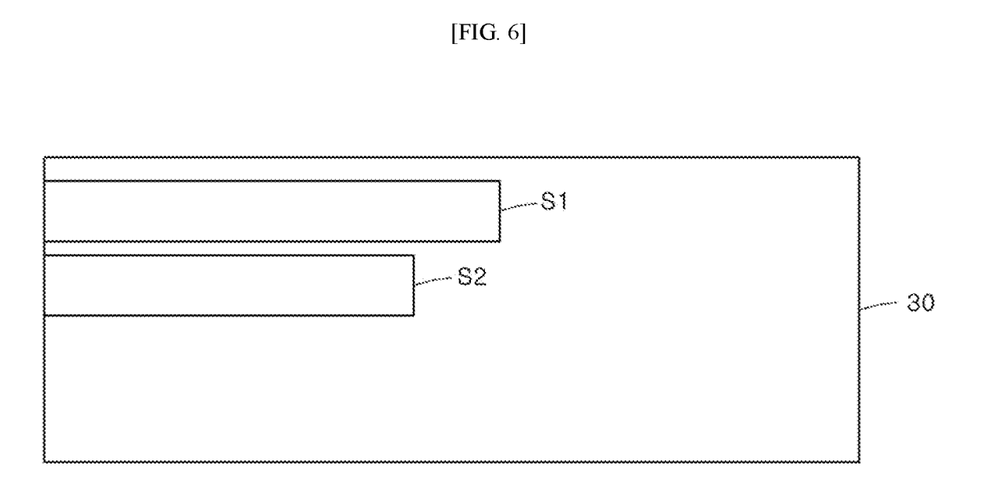
FIG. 6 is a schematic drawing for explaining a second method of displaying the length of the measurement object measured in FIGS. 2 to 4 as a reference value on a comparison part and adjusting the length of a new measurement object.

Meanwhile, comparison of the reference value S of the measurement object 2 through the comparison part 30 may be performed by two methods shown in FIGS. 5 and 6.

First, referring to FIG. 5, in the comparison part 30 including a display means, the reference value S corresponding to the measured value of the measurement object 2 previously measured is displayed as an image of a rectangular shape. A user may put the new measurement object 2 into the comparison part 30 so that the new measurement object 2 is compared with the displayed reference value S. Accordingly, a user may match the length of the measurement object 2 with the reference value S by adjusting the position of the stopper 3 of the measurement object 2 including an endodontic file.

In addition, as shown in FIG. 6, the comparison part 30 may display the reference value S previously measured as a first image S1, measure the length of the measurement object 2 to be measured through the measuring part 20, and display the length of the measurement object 2 as a second image S2. That is, in the comparison part 30, the reference value S and the measured value of the new measurement object 2 to be compared with the reference value S are respectively displayed as the first and second images S1 and S2 of a rectangular shape at the same time, and are compared with each other. In this case, the first and second images S1 and S2 are preferably displayed in parallel.

A method of measuring the measurement object 2 using the digital measurement apparatus 1 of the present disclosure having the above described configuration is described as follows with reference to FIG. 7.

Figure 7:
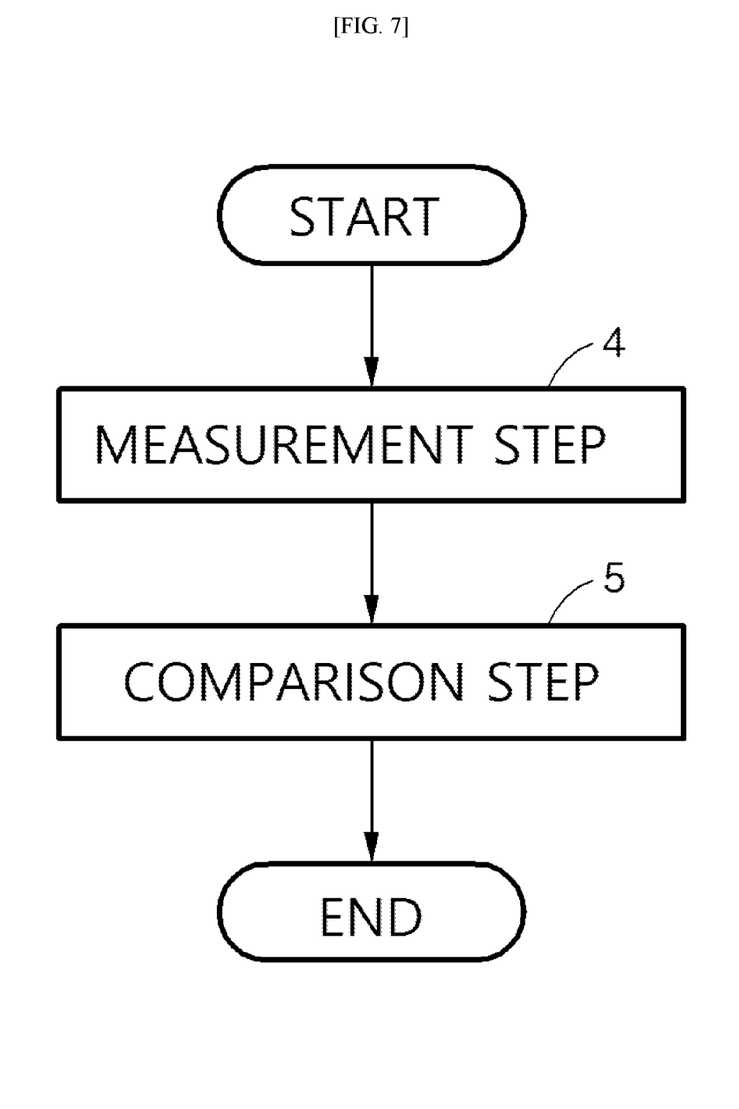
FIG. 7 is a flowchart schematically showing a digital measurement method according to one embodiment of FIGS. 1 to 6.

As shown in FIG. 7, the digital measurement method according to the present disclosure includes a measurement step 4 and a comparison step 5.

In the measurement step 4, a measurement value corresponding to the length of the measurement object 2 is measured. In the measurement step 4, the measurement object 2 is placed on the mounting part 10, and the length of the measurement object 2 is measured through a moving method. More specifically, in an initial state in which the moving member 21 is located near the reference point 11 of the mounting part 10, the measurement object 2 is placed so that the stopper 3 is arranged at the reference point 11. Then, as shown in FIG. 3, in conjunction with entry of the measurement object 2, the moving member 21 in contact with the end of the measurement object 2 is moved in the direction of the arrow, which is the entry direction of the measurement object 2.

At this time, the moving member 21 is moved along the rail 23 in conjunction with entry of the measurement object 2. In this case, the moving member 21 has force to move toward the reference point 11 by a motor (not shown) provided in the moving member 21, and is in close contact with the end of the measurement object 2.

Due to movement of the moving member 21, the electrostatic capacity of the copper plate 24 located at the bottom of the rail 23 changes. The conversion part 22 detects change in the electrostatic capacity of the copper plate 24, and the length of the measurement object 2 corresponding to the movement distance of the moving member 21 is calculated.

As shown in FIG. 4, even when the initial position of the moving member 21' is spaced apart from the reference point 11, change in an electrostatic capacity according to the movement distance of the moving member 21' is detected, and the conversion part 22 measures the length of the measurement object 2. That is, the conversion part 22 detects change in an electrostatic capacity occurring when the moving member 21' moves so as to be in close contact with the end of the measurement object 2 placed so that the stopper 3 is located at the reference point 11, and converts the change into the length of the measurement object 2.

In addition, when the moving member 21 is provided with an electromagnet rather than a motor, as shown in FIGS. 3 and 4, the moving member 21 has force to move toward the reference point 11 by electromagnetic force. Accordingly, the conversion part 22 detects change in an electrostatic capacity occurring when the moving member 21 is moved in conjunction with entry of the measurement object 2 on the mounting part 10, and converts the change into the length of the measurement object 2.

In the comparison step 5, the length of the measurement object 2 measured in the measurement step 4 is set as the reference value S, and the length of the newly placed measurement object 2 is compared with the reference value S. In addition, as shown in FIG. 5, the reference value S is displayed through the comparison part 30 including a display means, and the length of the measurement object 2 to be measured is compared with the reference value S. Alternatively, as shown in FIG. 6, on the comparison part 30, the reference value S may be displayed as the first image S1, the measured value of the measurement object 2 to be measured may be displayed as the second image S2, and the first and second images S1 and S2 may be compared with each other.

More specifically, in the comparison step 5, the new measurement object 2 may be continuously placed and measurement is performed repeatedly to perform length adjustment. The length of the measurement object 2 may be adjusted by the following two adjustment methods.

According to a first adjustment method, as shown in FIG. 5, a value measured in the measurement step 4 is displayed, through the comparison part 30 including a display means, as the reference value S that is an image of a rectangular shape. That is, the comparison part 30 displays the value measured in the measurement step 4 as the reference value S that is a reference for adjusting the length of the new measurement object 2.

Thereafter, a user places the new measurement object 2 on the comparison part 30 so that the new measurement object 2 matches the displayed reference value S. At this time, the user may match the length of the new measurement object 2 to the reference value S by adjusting the position of the stopper 3 so that the length from the stopper 3 of an endodontic file, which is the measurement object 2, to the end of the endodontic file matches the length of the reference value S. In addition, another measurement object 2 may be placed continuously to adjust a length.

A second adjustment method will be described with reference to FIG. 6.

As shown in FIG. 6, a value measured in the measurement step 4 is displayed as the first image S1 through the comparison part 30. In addition, when the new measurement object 2 is placed on the mounting part 10 and the length of the new measurement object 2 is measured, the measured value of the new measurement object 2 is displayed as the second image S2 through the comparison part 30. That is, the measuring part 20 provides the first image S1 as a reference for adjusting the length of the new measurement object 2, and displays the first and second images S1 and S2 side by side to compare the lengths of the first and second images S1 and S2 with each other.

A user matches the length of the new measurement object 2 to a length corresponding to a first measured value S1 by adjusting the length of the new measurement object 2 placed on the mounting part 10.

According to the second measurement method, another measurement object 2 is continuously placed on the mounting part 10 and is compared with the first image S1 displayed on the comparison part 30. Through this process, repeated length measurement for the new measurement object 2 may be performed.

Meanwhile, in the comparison step 5, a user may be notified of information indicating that the measured value of the measurement object 2 approaches the reference value S through a notification means such as a notification sound. For example, as the measured value of the measurement object 2 approaches the reference value S, by gradually increasing the frequency of a notification sound, a user may be notified of information indicating that the measured value is gradually approaching the reference value.

Figure 8:
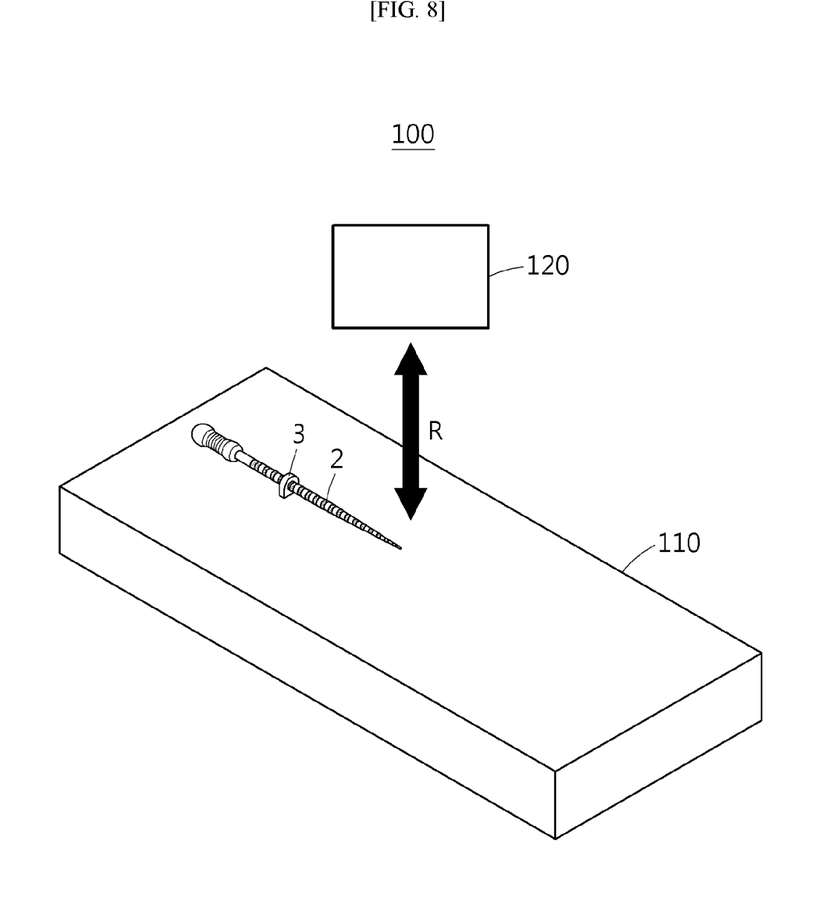
FIG. 8 is a drawing schematically showing a digital measurement apparatus according to another preferred embodiment of the present disclosure.

FIG. 8 schematically illustrates a digital measurement apparatus 100 according to another embodiment of the present disclosure.

As shown in FIG. 8, the digital measurement apparatus 100 includes a mounting part 110 and a measuring part 120.

The measurement object 2 to be measured is placed on the mounting part 110. Since the configuration of the mounting part 110 is similar to the configuration of the mounting part 10 according to one embodiment described with reference to FIGS. 1 to 4, detailed description thereof will be omitted.

The measuring part 120 performs measurement by comparing the length of the measurement object 2 placed on the mounting part 110 with a reference value that is a preset measurement value. The measuring part 120 according to another embodiment measures the length of the measurement object 2 through a radiation method of radiating a predetermined measurement signal R toward the measurement object 2 and converting an information value of the detected measurement signal R into the length of the measurement object 2.

Since the configuration of the measuring part 120 except for using the radiation method is the same as the above-described configuration, detailed description and illustration thereof will be omitted.

As shown in FIG. 8, the measuring part 120 according to another embodiment radiates a laser R toward the measurement object 2 and detects the reflected laser R to measure the length of the measurement object 2. In this case, the measuring part 120 measures a time from a time point at which the laser R is radiated toward the measurement object 2 to a time point at which the laser R is reflected back from the measurement object 2 and returned to the measuring part 120, converts the measured time into a length, and divides the length value by 2 to calculate the length of the measurement object 2.

In addition, when the signal intensity of the laser R reflected from the measuring part 120 is weak, the signal of the reflected laser R may be amplified by filtering. In this case, when the signal of the laser R incident on the measuring part 120 is amplified, the measuring part 120 determines the length of the measurement object 2 based on the magnitude of the amplified value.

Figure 9:
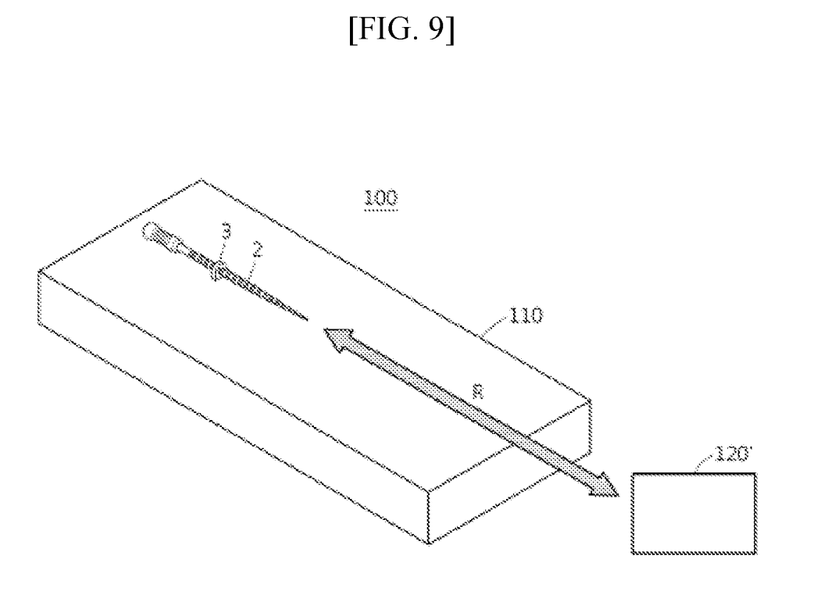
FIG. 9 is a drawing schematically showing a modified example of the measuring part shown in FIG. 8.

As shown in FIG. 8, the measuring part 120 may be configured to face the measurement object 2, may radiate the laser R in a direction perpendicular to the end of the measurement object 2, and may detect the reflected laser R. However, the present disclosure is not limited thereto. As shown in FIG. 9, as a modified example, a measuring part 120' may radiate the laser R, toward the end of the measurement object 2, in a direction horizontal to the longitudinal direction of the measurement object 2.

In addition, as another modified example, the measuring part 120 or 120' may measure the length of the measurement object 2 using an ultrasonic wave instead of the laser R. Even when the measuring part 120 or 120' radiates an ultrasonic wave, the measuring part 120 or 120' radiates an ultrasonic wave in a direction perpendicular or horizontal to the end of the measurement object 2, detects the ultrasonic wave signal reflected from the measurement object 2, and measures the length of the measurement object 2.

The value measured in the measuring part 120 or 120' is displayed as the reference value S on the comparison part 30 to provide a reference for the measurement object 2. The configuration of the comparison part 30 for measuring the length of the measurement object 2 is similar to the configuration according to one embodiment described with reference to FIGS. 5 to 7, and thus detailed description thereof will be omitted.

For example, although not shown in detail, an embodiment in which both measurement methods of the measuring parts 20 and 120 according to one and another embodiment are used is also possible. That is, by converting a distance that the moving member 21 is moved until the moving member 21 is brought into contact with the measurement object 2, and converting a time from a time point at which the laser R is radiated toward the measurement object 2 to a time point at which the reflected laser returns, the length of the measurement object 2 may be measured, and may be compared with a reference value.

In addition, as another embodiment, the measuring parts 20 and 120 may be applied to a scanning method in which the shadow of the measurement object 2 is recognized using a light sensor. In the case of the scanning method, the mounting part 10 on which the measurement object 2 is placed includes a scanner. In addition, light is radiated in a direction perpendicular to the measurement object 2 placed on the mounting part 10 including the scanner, the shadow of the measurement object 2 is recognized, and the measuring parts 20 and 120 measure the length of the measurement object 2.

In this case, measurement is preferably performed in an enclosed space so as to prevent the shadow of the measurement object 2 from being distorted. In addition, since the measurement object 2 should be uniformly irradiated with light, it is preferable not to use a prism.

The invention claimed is:

1. A digital measurement apparatus, comprising:
a mounting part on which a measurement object is placed; and
a measuring part for measuring a length of the measurement object and providing a measurement value of the measured measurement object as a reference value for adjusting a length of a new measurement object,
wherein the measuring part measures the length of the measurement object using any one selected from among a moving method of converting a distance moved due to interference with the measurement object placed on the mounting part; a radiation method of radiating a measurement signal toward the measurement object and converting information of the detected measurement signal into a length of the measurement object; and a scanning method of scanning the measurement object.

2. The digital measurement apparatus according to claim 1, wherein the mounting part comprises a flat cradle provided with a reference point with which one side of the measurement object is aligned, and the measurement object comprises an endodontic file provided with a stopper, wherein the measurement object is placed on the mounting part so that the stopper is aligned with the reference point.

3. The digital measurement apparatus according to claim 1, wherein the mounting part is configured to be removable for disinfection.

4. The digital measurement apparatus according to claim 1, wherein the measuring part comprises a moving member movable in conjunction with the measurement object; and
a conversion part for converting the movement distance according to movement of the moving member into a length of the measurement object.

5. The digital measurement apparatus according to claim 4, wherein the moving member is equipped with a driving means, has driving force to be pressurized toward the measurement object, and is capable of linear reciprocating motion along a rail, and
the conversion part converts change in an electrostatic capacity due to a driving rotational speed of the moving member moving along the rail or movement of the moving member into a length of the measurement object.

6. The digital measurement apparatus according to claim 4, wherein the moving member is capable of linear reciprocating motion along a rail by comprising an electromagnet that selectively generates electromagnetic force according to a signal input from outside and is capable of pressurizing the moving member toward the measurement object, and
the conversion part converts change in an electrostatic capacity due to driving rotational speed of the moving member moving along the rail or movement of the moving member into a length of the measurement object.

7. The digital measurement apparatus according to claim 1, wherein, in the radiation method, the measuring part radiates the measurement signal in a horizontal or perpendicular direction toward an end of the measurement object.

8. The digital measurement apparatus according to claim 7, wherein the measurement signal comprises a laser or ultrasonic signal.

9. The digital measurement apparatus according to claim 7, wherein the measuring part measures a time from a time point at which the measurement signal is radiated toward the measurement object to a time point at which the measurement signal is reflected back from the measurement object and returned to the measuring part, converts the measured time into a length, and divides the length by 2 to calculate a length of the measurement object.

10. The digital measurement apparatus according to claim 1, wherein the mounting part comprises a scanner on which the measurement object is placed, wherein the scanner is provided in an enclosed space, and
the measuring part radiates light toward the measurement object and scans a shadow of the measurement object.

11. The digital measurement apparatus according to claim 1, comprising a comparison part for displaying a reference value measured in the measuring part and comparing a length of the new measurement object with the reference value.

12. The digital measurement apparatus according to claim 11, wherein the new measurement object is placed to be adjacent to the reference value displayed on the comparison part, and a length of the measurement object is adjusted so that the length of the measurement object matches the reference value.

13. The digital measurement apparatus according to claim 11, wherein a first image corresponding to the reference value and a second image corresponding to a measured value for a length of the new measurement object measured in the measuring part are displayed side by side on the comparison part, and
   a length of the new measurement object is adjusted so that the second image matches the first image.

14. A digital measurement method, comprising:
   a measurement step of measuring a length of a measurement object to be measured; and
   a comparison step of setting a value measured in the measurement step as a reference value and comparing a length of a new measurement object with the reference value to adjust the length of the new measurement object,
   wherein, in the measurement step, a length of the measurement object is measured using any one selected from among a moving method of converting a distance moved due to interference with the measurement object; a radiation method of radiating a measurement signal toward the measurement object and converting information of the detected measurement signal into a length of the measurement object; and a scanning method of scanning the measurement object.

15. The digital measurement method according to claim 14, wherein the measurement step comprises a moving step in which a moving member is moved along a rail so that the moving member is pressurized toward the measurement object; and
   a conversion step of detecting change in an electrostatic capacity or change in a driving rotational speed due to movement of the moving member and converting the change into a length of the measurement object,
   wherein, in the moving step, the moving member is pressurized toward the measurement object by driving force of a motor or electromagnetic force of an electromagnet and is moved toward the measurement object.

16. The digital measurement method according to claim 14, wherein the measurement step comprises a radiation step of radiating the measurement signal toward the measurement object; and
   a conversion step of converting the measurement signal reflected back from the measurement object into a length and dividing the length by 2 to calculate a length of the measurement object,
   wherein the measurement signal comprises a laser or ultrasonic signal.

17. The digital measurement method according to claim 16, wherein the measurement signal is radiated in a horizontal or perpendicular direction toward an end of the measurement object.

18. The digital measurement method according to claim 14, wherein, in the measurement step, light is radiated toward the measurement object placed on a scanner and a shadow of the measurement object is scanned.

19. The digital measurement method according to claim 14, wherein the comparison step comprises a display step of displaying the reference value as an image through a display means; and
   an adjustment step of placing the new measurement object so as to be adjacent to the image and adjusting a length of the new measurement object so as to match the image.

20. The digital measurement method according to claim 14, wherein the comparison step comprises a display step of displaying the reference value as a first image on a display means; and
   an adjustment step of displaying a measured value of the new measurement object as a second image on the display means so as to be adjacent to the first image and adjusting a length of the new measurement object so that the first and second images match.

21. The digital measurement method according to claim 14, further comprising, after the comparison step, a notification step of notifying that a measured value of the new measurement object matches the reference value.

* * * * *